United States Patent Office 3,828,071
Patented Aug. 6, 1974

3,828,071
CATALYTIC OXIDATION OF ARYLMETHANE
COMPOUNDS
Hellmut Kast, Hans Baumann, and Udo Mayer, Ludwigs-
hafen, and Andreas Oberlinner, Mannheim, Germany,
assignors to Badische Anilin- & Soda-Fabrik Aktien-
gesellschaft, Ludwigshafen (Rhine), Germany
No Drawing. Filed July 28, 1972, Ser. No. 276,108
Claims priority, application Germany, Aug. 4, 1971,
P 21 38 931.1; Oct. 22, 1971, P 21 52 703.7; May
29, 1972, P 22 26 039.5; June 2, 1972, P 22 26 936.9
Int. Cl. C07d 27/56
U.S. Cl. 260—326.15
5 Claims

ABSTRACT OF THE DISCLOSURE

A process for the catalytic oxidation of p-amino-sub-
stituted di-(hetero)-arylmethane and tri-(hetero)-aryl-
methane compounds with oxygen in the presence of a
quinone and a catalyst containing a heavy metal in com-
plex form. The process is eminently suitable for the pro-
duction of p-amino-substituted diarylketones and basic
dyes avoiding the usual pollution problems.

---

The invention relates to a process for the catalytic oxidation of a compound of the formula (I):

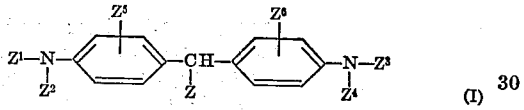

(I)

in which, independently of one another, $Z^1$, $Z^2$, $Z^3$ and $Z^4$ are hydrogen or unsubstituted or substituted alkyl, cycloalkyl, aralkyl or aryl;

$Z^1$ and $Z^2$, or $Z^3$ and $Z^4$, together with the nitrogen may be a heterocycle;

$Z^5$ is hydrogen, halogen, alkyl, or alkoxy;

$Z^6$ is hydrogen, halogen, alkyl or alkoxy; and

Z is hydrogen, unsubstituted or substituted aryl, or a heterocyclic radical, wherein a compound of the formula (I) is treated with a benzoquinone bearing fluorine, chlorine, bromine, or cyano as a substituent or phenanthrenequinone bearing nitro as a substituent in the presence of oxygen and an oxygen-activating catalyst containing a heavy metal in complex combination.

Compounds of the formula (I) are in particular the leuco compounds of basic dyes, diarylmethane bases and compounds of the type of leuco-crystal violet lactone.

The leuco compounds of basic dyes may be represented by the formula (II):

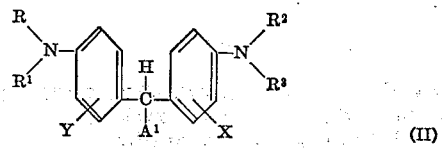

(II)

in which, independently of one another, R is hydrogen, alkyl of one to four carbon atoms, hydroxyalkyl of two or three carbon atoms, cyanoethyl, carboalkoxyalkyl of a total of 2 to 5 carbon atoms, methoxyethyl, ethoxyethyl, alkanoyloxyalkyl of a total of four to eleven carbon atoms, cyclohexyl, benzyl, phenylethyl, phenyl, phenyl bearing methyl, methoxy or ethoxy as a substituent, or a radical of the formula

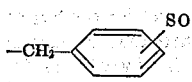

$R^1$ is hydrogen, alkyl of one to four carbon atoms, hydroxyalkyl of two or three carbon atoms, cyanoethyl, methoxyethyl, ethoxyethyl or phenyl; R and $R^1$ together with the nitrogen may form a heterocyclic radical; or R or $R^1$ may be combined with the ortho-position of the benzene ring to form a condensed heterocycle;

$R^2$ is the same radical as R;

$R^3$ is the same radical as $R^1$;

X is hydrogen, chlorine, methyl, methoxy or ethoxy;

Y is hydrogen, chlorine, methyl, methoxy or ethoxy;

$A^1$ is phenyl, phenyl bearing one or two of chlorine, methyl, hydroxy, methoxy, ethoxy or the sulfonic acid group as substituents, a heteroaromatic radical or a radical of the formula:

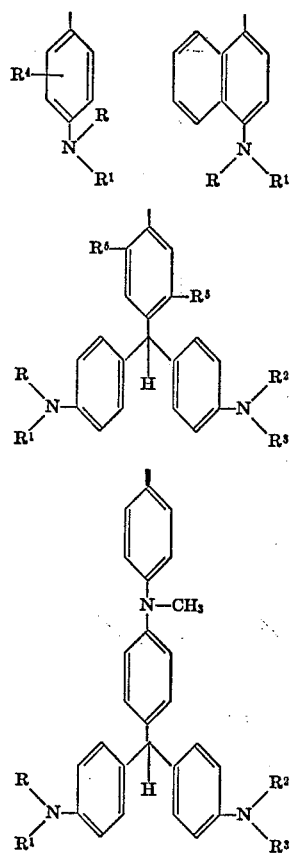

$R^4$ is hydrogen, chlorine, methyl, methoxy, ethoxy, acylamino or alkoxycarbonyl; and
$R^5$ is hydrogen or chlorine.

In the oxidation according to the process of the invention, compounds of the formula (II) are converted into basic dyes of the formula (III):

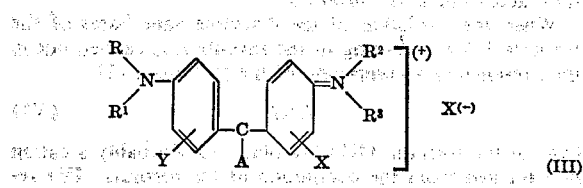

(III)

in which

R, $R^1$, $R^2$, $R^3$, X and Y have the meanings given above;
$X^{(-)}$ is an anion; and
A is phenyl, phenyl bearing one or two of the substituents chlorine, methyl, hydroxy, methoxy, ethoxy or the sulfonic acid group, a heteroaromatic radical or a radical of the formulae:

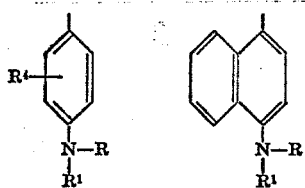

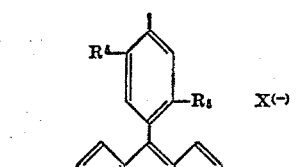

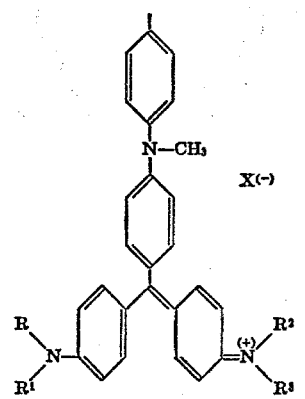

Diarylmethane bases to be oxidized according to the invention correspond to the formula (IV):

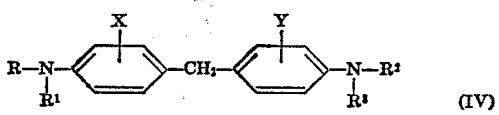

in which X, Y, and R, $R^1$ and $R^2$ and $R^3$ have the meanings given above. During oxidation the compounds of the formula (IV) are converted into the corresponding ketones of the formula (V):

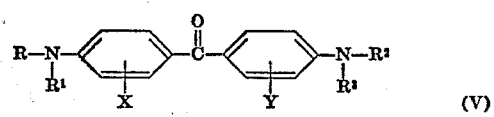

The compounds of the formula (IV) may be used as such but they may also be formed in the reaction mixture from the appropriate starting materials (for example formaldehyde+dialkylaniline) under the reaction conditions according to the invention.

When the oxidation of the diarylmethane bases of the formula (IV) according to the invention is carried out in the presence of a compound of the formula (VI):

(VI)

dyes of the formula (III) are obtained. Probably a cation first formed from the compound of the formula (IV) reacts with the compound of the formula $A^1H$ to form the corresponding leuco compound of the formula (II) which is then further oxidized to the dye of the formula (III).

Compounds of the type of leuco crystal violet lactone correspond to the formula (VIII):

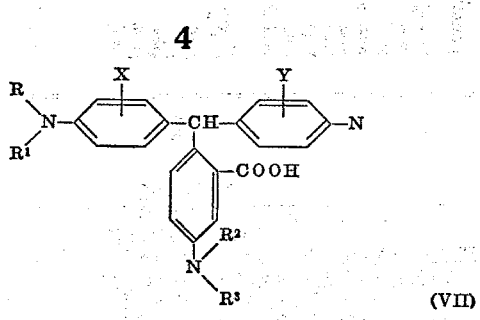

in which X, Y, R, $R^1$, $R^2$ and $R^3$ have the meanings given above. The compounds of the formula (VII) are converted during the oxidation into the lactones of the formula (VIII):

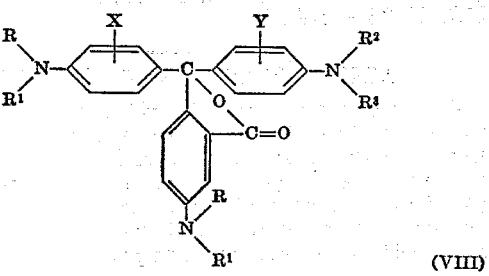

The following radicals are given as examples in addition to the substituents already specified:

for R: methyl, ethyl, propyl, butyl, β-hydroxyethyl, β-hydroxypropyl, β-carbomethoxyethyl, β-carboethoxyethyl, β-carbobutoxyethyl, β-acetoxyethyl, β-propionyloxyethyl, or β-(2-ethylhexanyl)-oxyethyl; for $R^1$: methyl, ethyl, propyl, butyl β-hydroxyethyl, or β-hydroxypropyl;

for a heterocyclic radical from R and $R^1$ and the nitrogen: the radical of morpholine, piperidine, piperazine or pyrrolidine;

for a condensed heterocycle when R or $R^1$ is combined with the orthoposition: 1,2,4-tetramethyl-1,2-dihydroquinoline, 1,2,2,4 - tetramethyl-1,2,3,4-tetrahydroquinoline, 2,2,4-trimethyl-1,2-dihydroquinoline, 1,2-dimethyl-2,3-dihydroindole, 1 - butyl-3-hydroxy-7-methyl-1,2,3,4-tetrahydroquinoline.

Examples of heteroaromatic radicals A are:

1-methyl-2-phenylindolyl-3,
2-methylindolyl-3,
2-phenylindolyl-3,
1-cyanoethyl-2-methylindolyl-3,
1-phenylpyrazolyl-4,
1-phenyl-3-methylpyrazolyl-4,
1-phenyl-2,3-dimethylpyrazolinon-5-yl-4,
1,4-perimidinyl-4, or
perimidonyl-4.

Preferred radicals are:

for R: hydrogen, methyl, ethyl, cyanoethyl, phenyl, p-methoxyphenyl or p-ethoxyphenyl;
for $R^1$: hydrogen, methyl or ethyl;
for X: hydrogen, chlorine, methyl or methoxy;
for Y: hydrogen, chlorine, methyl or methoxy;
for A: phenyl, phenyl bearing chlorine, methoxy or a sulfonic acid group as a substituent, p-dimethylamino phenyl or p-diethylaminophenyl and the said indolyl radicals;
for $R^4$ and $R^5$: hydrogen.

Compounds with R and $R^1$ methyl or ethyl and X and Y hydrogen are of particular industrial significance.

Examples of anions $X^{(-)}$ are bromide, tetrafluoroborate, formate, methosulfate or ethosulfate and particularly chloride, nitrate, acetate or tetrachlorozincate.

Quinones which act as oxidizing agents are for example:
tetrafluoro-1,4-benzoquinone,
tetrabromo-1,4-benzoquinone,
tetrachloro-1,4-benzoquinone,
dichlorodicyano-1,4-benzoquinone,
tetracyano-1,4-benzoquinone,
2-nitrophenanthrenequinone,
2,7-dinitrophenanthrenequinone,
4,5-dinitrophenanthrenequinone,
tetrachloro-1,2-benzoquinone, or
tetrabromo-1,2-benzoquinone.

It is preferred to use tetrachloro-1,4-benzoquinone and tetrabromo-1,4-benzoquinone.

The quinones may be used as such or in the form of the hydroquinones. Nitrophenanthrenequinones and the haloquinones may be used in pure form or as mixtures such as are obtained in synthesis.

Examples of suitable heavy metals for the oxidation catalysts are copper, vanadium, molybdenum and preferably iron and cobalt. The metals are present in the catalysts in complex combination with nitrogen and oxygen atoms in the chelate-forming substance.

The following are examples of specific compounds:
Copper complex compounds of:
  (1) 2-aminoethanol,
  (2) 1,2-diaminoethane,
  (3) 1,2-diaminopropane,
Cobalt complex compounds of the azomethine of:
  (4) 1,2-diaminoethane+ 2 moles of 2-hydroxybenzaldehyde;
  (5) 1,2-diaminopropane+2 moles of 2-hydroxybenzaldehyde;
  (6) 1,3-diaminopropane+2 moles of 2-hydroxybenzaldehyde;
  (7) 1,2-diaminobenzene+2 moles of 2-hydroxybenzaldehyde;
  (8) 1,2-diamino-4-chlorobenzene+2 moles of 2-hydroxybenzaldehyde;
  (9) 1,2-diaminobenzene+2 moles of 2-hydroxy-3,5-dichlorobenzaldehyde;
  (10) 1,2-diamino-4-chlorobenzene+2 moles of 2-hydroxy-3,5-benzaldehyde;
  (11) 1,2-diaminoethane+2 moles of 2-hydroxy-5-nitrobenzaldehyde;
  (12) 1,2-diaminoethane+2 moles of 2-hydroxy-3-methoxybenzaldehyde;
  (13) 1,2-diaminoethane+2 moles of 2-hydroxy-3-ethoxybenzaldehyde;
  (14) bis-(3-aminopropyl)-amine+2 moles of 2-hydroxybenzaldehyde;
  (15) 1,2-diaminobenzene+2 moles of 2-hydroxy-5-nitrobenzaldehyde;
  (16) 1,2-diaminoethane+2 moles of 2-hydroxynaphthaldehyde-1;
  (17) 1,2-diaminopropane+2 moles of 2-hydroxynaphthaldehyde-1;
  (18) 1,2-diaminobenzene+2 moles of 2-hydroxynaphthaldehyde-1;
  (19) 1,2-diamino-4-chlorobenzene+2 moles of 2-hydroxynaphthaldehyde-1;
  (20) 1,2-diaminobenzene+2 moles of 3-formyl-4-methyl-5-cyano-2,6-dihydroxypyridine;
  (21) 1,2,4,5-tetraminobenzene+4 moles of 2-hydroxybenzaldehyde;
Cobalt complex compounds of:
  (22) the formazane from cyanoacetic acid+2 moles of the diazo compound of 4-chloro-2-aminophenol-6-sulfonic acid;
  (23) the tetraaza [14] annulene fom 1,2-diaminobenzene+malonodialdehyde;
  (24) the tetraaza [14] annulene from 1,2-diamino-4-chlorobenzene+malonodialdehyde;
  (25) phthalocyanine.

Iron complex compounds of:
  (26) phthalocyanine (FeII);
  (27) phthalocyanine (FeIII);
  (28) hexadecachlorophthalocyanine;
  (29) phthalocyanine-tri (or tetra)-sulfonic acid (γ-dialkylaminopropyl)-amide;
  (30) hematin;
  (31) the oxo-vanadium complex compound of the azomethine from 1,2-diaminoethane+2 moles of 2-hydroxybenzaldehyde; or
  (32) the dioxo-molybdenum complex compound of the azomethine from 1,2-diaminoethane+2 moles of 2-hydroxybenzaldehyde.

Examples of catalysts which are preferred industrially are (4) to (14), (23), (24), (26) and (27).

It may be advantageous to use the catalysts applied to carriers. Examples of suitable carrier materials are activated carbon, diatomaceous earth, aluminum oxide or ceramic materials. The production of such catalysts is disclosed in the literature, for example in that relating to fuel cells.

It is advantageous to carry out the new process by dehydrogenating the compounds of the formula (II) in solution or suspension in the neutral to acid pH range at temperatures of from about 0° to 150° C., preferably at from 30° to 60° C., with about $10^{-3}$ to $10^{-1}$ mole of quinone based on the molar amount of compound (II), the catalysts conveniently being added in an amount which is once to four times that of the quinones. The complex catalysts may be added as such to the reaction mixture or may be formed in the reaction mixture from the individual components.

Equipment such as is conventionally used for mixing a gas and a liquid, as for example described in Houben-Weyl, vol. 4/2, pp. 261–276, is suitable for supplying and mixing the oxygen (usually pure oxygen or air) with the mixture to be oxidized. It is naturally also possible to use superatmospheric pressure.

Examples of solvents which are suitable for the oxidation reaction are: methanol, ethanol, propanol, butanol, glycol, methylglycol, dimethylglycol, tetrahydrofuran, dioxan, ethyl acetate, chloroform, 1,2-dichloroethane, carbon tetrachloride, methylene chloride, chlorobenzene, dichlorobenzene, benzene, toluene, xylene, acetic acid, propionic acid, and lactic acid and also mixtures of these solvents. The oxidation reaction may also be carried out in aqueous suspension with the addition of emulsifiers such as sperm oil alcohol condensed with 28 moles of ethylene oxide, and if necessary defoamers such as triisobutyl phosphate. Chlorohydrocarbons, low molecular weight aliphatic carboxylic acids and alcohols are the preferred solvents.

The oxidation, depending on the compounds of the formula (I), may be carried out in neutral to acid pH range; as a rule the acid pH range, particularly from 1 to 4, is used in the case of dyes and the neutral pH range in the case of compounds of the formula (IV) and (VII).

The following are examples of suitable substances for adjusting the pH: water-soluble carboxylic acids of low molecular weight such as formic acid, lactic acid, chloroacetic acid, dichloroacetic acid, trichloroacetic acid, sulfonic acids such as benzenesulfonic acid or sulfuric acid and particularly acetic acid, propionic acid or toluenesulfonic acid.

Compounds of the formula (I) to be oxidized are present in the solutions or suspensions in concentrations advantageously of from 5 to 60%, preferably from 20 to 60%, by weight based on the weight of the solution or suspension.

The following examples illustrate the invention. Parts and percentages are by weight unless otherwise stated.

EXAMPLE 1

A mixture of 70 parts of leuco malachite green, 36 parts of glacial acetic acid, 144 parts of chloroform, 1 part of the complex No. (4) and 1 part of chloroanil is treated with air at 50° C. After the oxidation is over, the reaction mixture contains malachite green in a yield of 96%. It is recovered therefrom by distilling off the chloroform, taking up the residue in hot water, filtering and precipitating with sodium chloride.

The following leuco compounds may be oxidized into dyes in the same way:

| Example | Leuco compound | Dye yield (percent) |
|---|---|---|
| 2 | [structure] | 94 |
| 3 | [structure] | 95 |
| 4 | [structure] | 82 |
| 5 | [structure] | 89 |
| 6 | [structure] | 74 |
| 7 | [structure] | 67 |
| 8 | [structure] | 91 |
| 9 | [structure] | 83 |
| 10 | [structure] | 63 |
| 11 | [structure] | 90 |

TABLE—Continued

| Example | Leuco compound | Dye yield (percent) |
|---|---|---|
| 12 | (structure) | 92 |
| 13 | (structure) | 79 |
| 14 | (structure) | 55 |

EXAMPLE 15

A mixture of 81 parts of leuco diamond green, 45 parts of glacial acetic acid, 145 parts of ethylene chloride, 2 parts of the complex No. (23) and 1 part of chloroanil is treated with oxygen at 40° C. After the oxidation is over, the reaction mixture contains diamond green in a yield of 94%.

EXAMPLE 16

A mixture of 89 parts of the compound of the formula:

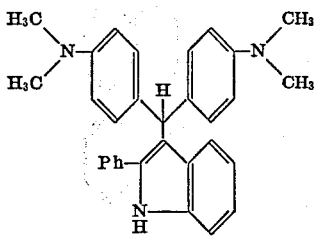

40 parts of propionic acid and 140 parts of methanol, 1 part of complex No. (7) and 1 part of chloroanil is treated with air at 45° C. After the oxidation is over the methanol is distilled off and the residue is taken up in water, the solution filtered and the dye precipitated with sodium chloride. The yield of dye is 89%.

EXAMPLE 17

A mixture of 77 parts of the compound of the formula:

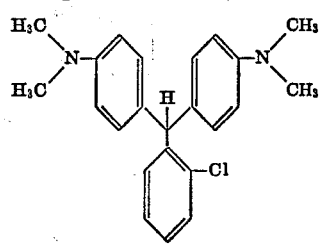

45 parts of glacial acetic acid, 135 parts of ethyl acetate, 1 part of complex No. (27) and 1 part of tetrabromobenzoquinone-1,4 is treated with oxygen at 50° C. After oxidation is over the ethyl acetate is distilled off and the residue is taken up in hot water and filtered and the dye precipitated with sodium chloride. Yield: 89%.

EXAMPLE 18

A suspension of 70.4 parts of the compound of the formula:

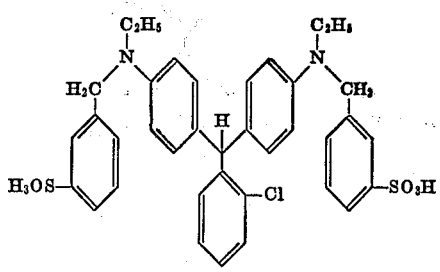

200 parts of water, 1 part of complex No. (4) and 1 part of chloroanil is treated with oxygen at 60° C. After oxidation is over the solution is filtered and the dye is precipitated by adding sodium chloride solution. Yield: 83%.

EXAMPLE 19

A suspension of 70 parts of leuco malachite green, 300 parts of water, 60 parts of glacial acetic acid, 2 parts of complex No. (23), 2 parts of chloroanil, 4 parts of sperm oil alcohol condensed with 20 moles of ethylene oxide and 4 parts of triisobutyl phosphate is treated with air at 50° C. with intense stirring. The yield of dye, after the oxidation is over, is 82%.

EXAMPLE 20

A mixture of 254 parts of 4,4′-bisdimethylaminodiphenylmethane, 121 parts of dimethylaniline, 10 parts of chloroanil, 10 parts of the complex No. (23), 1480 parts of chloroform and 360 parts of glacial acetic acid is treated with oxygen in a closed apparatus at 50° C. with vigorous stirring. Absorption of oxygen almost stops after a consumption of 22.4 parts. The chloroform is removed from the reaction mixture by distillation. The residue is dissolved in 1200 parts of water at 80° C., the solution is filtered and then a small amount of concentrated sulfuric acid is added. The dye (Basic Violet 3) is precipitated after addition of concentrated NaCl solution. The yield is 343 parts.

The following diphenylmethanes and compounds of the formula (VI) may be oxidized into triarylmethane dyes in the same way:

| Example | Diphenylmethane | Compound of formula (VI) | Yield (percent) |
|---|---|---|---|
| 21 | 4,4′-bisdimethylamino- | (structure) | 81 |
| 22 | do | (structure) | 89 |
| 23 | do | (structure) | 88 |

TABLE—Continued
| Example | Diphenylmethane | Compound of formula (VI) | Yield (percent) |
|---|---|---|---|
| 24 | 4,4'-bisdimethyl-amino- | 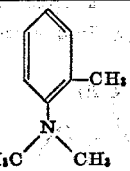 | 72 |
| 25 | do | 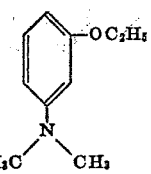 | 86 |
| 26 | do | 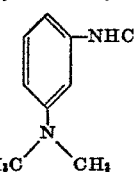 | 90 |
| 27 | do | 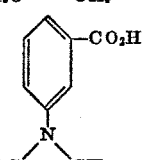 | ca. 30 |
| 28 | do | 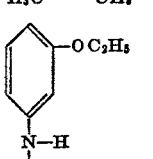 | 62 |
| 29 | do | 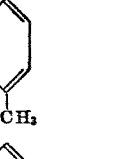 | 79 |
| 30 | do | 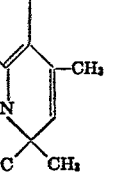 | 83 |
| 31 | do | 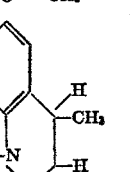 | 65 |
| 32 | do | 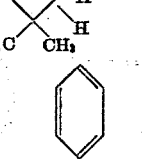 | 67 |
| 33 | 4,4'-bisdimethyl-amino- | 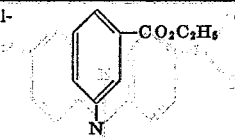 | 41 |
| 34 | do | 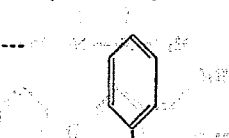 | 59 |
| 35 | do | 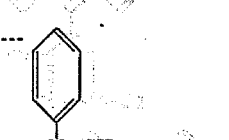 | 67 |
| 36 | do |  | 83 |
| 37 | do | 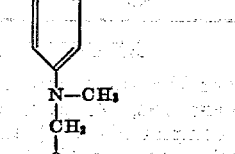 | 75 |
| 38 | do | 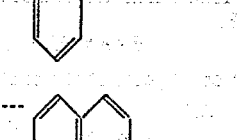 | 78 |
| 39 | do | 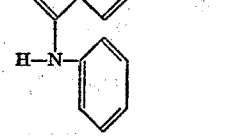 | 88 |
| 40 | do | 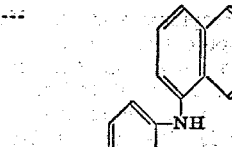 | 67 |

TABLE—Continued

| Example | Diphenylmethane | Compound of formula (VI) | Yield (percent) |
|---|---|---|---|
| 41 | 4,4'-bisdimethylamino- | (N-phenyl-1-naphthylamine structure) | 58 |
| 42 | do | (2-phenylindole) | 88 |
| 43 | do | (2-methylindole with H₃C-) | 86 |
| 44 | do | (1-methyl-2-phenylindole) | 88 |
| 45 | do | (N-ethyl-N-phenylaniline, H₅C₂, C₂H₅) | 90 |
| 46 | do | (N-ethyl-1-naphthylamine, H₅C₂, H) | 57 |
| 47 | 4,4'-bisdiethylamino- | (1-(4-ethoxyphenylamino)naphthalene, H₅C₂O-) | 74 |
| 48 | do | (2-phenylindole) | 90 |
| 49 | 4,4'-biscyanoethylmethylamino- | (N,N-dimethylaniline) | 81 |
| 50 | do | (N-ethyl-N-phenyl, H₃C₂, C₂H₅) | 82 |
| 51 | 4,4'-bisdimethylamino-2,2'-dimethyl- | (N,N-dimethylaniline) | 73 |
| 52 | do | (N,N-diethylaniline, H₅C₂, C₂H₅) | 69 |

When the complex No. (23) used in Example 20 is replaced by other complex compounds, the following yields are obtained:

Complex No.:                     Yield in percent
- (1) — 31
- (4) — 91
- (5) — 89
- (6) — 88
- (7) — 92
- (8) — 91
- (9) — 90
- (10) — 86
- (11) — 85
- (12) — 90
- (13) — 92
- (14) — 84
- (15) — 87
- (16) — 81
- (17) — 79
- (18) — 88
- (19) — 87
- (20) — 85
- (21) — 79
- (24) — 88
- (27) — 91

EXAMPLE 53

A mixture of 254 parts of 4,4'-bisdimethylaminodiphenylmethane, 121 parts of dimethylaniline, 5 parts of chloranil, 5 parts of complex No. (23), 25 parts of sperm oil alcohol condensed with 20 moles of ethylene oxide, 20 parts of triisobutyl phosphate, 175 parts of glacial acetic acid and 700 parts of water is treated with air through an atomizing nozzle at 50° C. in a circulatory apparatus. 1500 parts of water is then added to the reaction solution and it is heated to 80° C., filtered, a little concentrated hydrochloric acid is added and the dye is precipitated by adding concentrated sodium chloride solution. The yield is 377 parts of dye.

EXAMPLE 54

A mixture of 447 parts of diethylaniline, 30 parts of paraformaldehyde, 10 parts of chloranil, 10 parts of complex No. (4), 500 parts of glacial acetic acid and 1500 parts of ethylene chloride is treated with air at 50° C. with vigorous stirring. Seven hours later the ethylene chloride is removed by distillation, the residue is dissolved in 1500 parts of water at 80° C., the solution is filtered, a little concentrated hydrochloric acid added to the filtrate and the dye (C.I. Basic Violet 4) is precipitated with concentrated sodium chloride solution. The yield is 377 parts of dye.

The following anilines may be reacted to form triphenylmethane dyes in a similar way:

| Example | Aniline | Yield (percent) |
|---|---|---|
| 55 | H₃C, CH₃ / N / phenyl | 86 |
| 56 | H₃C, C₂H₄CN / N / phenyl | 64 |
| 57 | H₅C₂, CH₂—phenyl / N / phenyl | 68 |
| 58 | H₃C, CH₃ / N / phenyl (2) : H, CH₃ / N / phenyl (1) | 71 |

EXAMPLE 59

A mixture of 254 parts of N,N'-bisdimethylaminodiphenylmethane, 121 parts of dimethylaniline, 10 parts of bromoanil, 10 parts of complex No. (27) applied to activated carbon (weight ratio 1:1), 1480 parts of ethanol and 360 parts of propionic acid is treated in a closed vessel with oxygen at 50° C. with vigorous stirring. Absorption of oxygen almost ceases after a consumption of 22 parts. The ethanol is removed from the reaction mixture by distillation, the residue is dissolved in 1200 parts of water, the solution is filtered, a little concentrated hydrochloric acid is added and the dye is precipitated by adding concentrated sodium chloride solution. The yield is 337 parts.

EXAMPLE 60

A mixture of 254 parts of N,N'-bisdimethylaminodiphenylmethane, 121 parts of dimethylaniline, 10 parts of tetrachlorohydroquinone, 10 parts of the condensation product of 1 mole of 0-phenylenediamine with 2 moles of salicylaldehyde, 5 parts of cobalt acetate, 2000 parts of ethylene chloride and 172 parts of p-toluenesulfonic acid is treated with air for eight hours. After having been processed according to Example 21 349 parts of dye is obtained.

EXAMPLE 61

291 parts of N-ethyl-N-benzylaniline-3-sulfonic acid is dissolved in 1600 parts of water and a little caustic soda solution. 25 parts of the adduct of 1 mole of sperm oil alcohol and 20 moles of ethylene oxide is then added as well as 25 parts of triisobutyl phosphate and then a mixture of 254 parts of 4,4'-bisdimethylaminodiphenylmethane, 400 parts of glacial acetic acid, 10 parts of chloroanil and 10 parts of the complex No. (23). The reaction mixture is treated with air at 50° C. for twelve hours, then 2000 parts of water is added, the whole heated to 90° C. and filtered. The dye is then precipitated with concentrated sodium chloride solution. The yield is 249 parts.

EXAMPLE 62

A mixture of 508 parts of 4,4'-bisdimethylaminodiphenylmethane, 10 parts of chloroanil and 20 parts of complex No. (4) and 1970 parts of methanol is treated in a closed apparatus with oxygen at 50° C. with vigorous stirring. The absorption of oxygen almost ceases after a consumption of 64 parts. After having been cooled, the precipitated 4,4'-bisdimethylaminobenzophenone is suction filtered and washed with methanol. The yield is 459 parts; melting point 172° to 174°.

By replacing complex No. (4) in Example 62 by other complex compounds, the following yields are obtained:

| Example | Complex No. | Yield (percent) |
|---|---|---|
| 63 | 5 | 86 |
| 64 | 6 | 84 |
| 65 | 7 | 79 |
| 66 | 8 | 81 |
| 67 | 9 | 74 |
| 68 | 10 | 82 |
| 69 | 14 | 78 |
| 70 | 23 | 59 |
| 71 | 26 | 52 |

EXAMPLE 72

Air is passed at 55° C. with vigorous stirring for eight hours into a solution of 846 parts of 4,4'-bisdiethylaminodiphenylmethane, 10 parts of tetrabromohydroquinone, 20 parts of complex No. (6) and 1650 parts of propanol. After cooling, the crystalline precipitate is suction filtered and washed with a little ice-cold propanol.

The yield is 670 parts; melting point: 92° to 94° C. The yield can be improved by working up the filtrate.

EXAMPLE 73

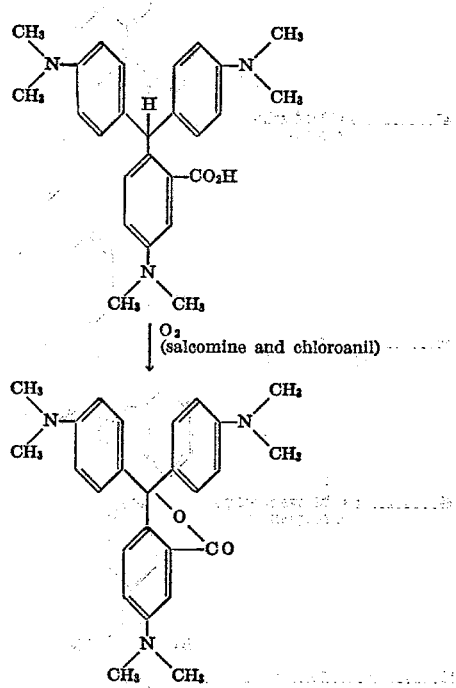

A suspension of 417 parts of leuco crystal violet-o-carboxylic acid, 400 parts of glacial acetic acid, 1600 parts of chloroform, 10 parts of chloroanil and 10 parts of salcomine is oxidized at 50° C. with 32 parts of oxygen.

The resulting suspension is evaporated at subatmospheric pressure to dryness and the residue taken up in methanol and suction filtered. The yield is 393 parts of crystalline crystal violet lactone. Melting point: 172° to 174° C.

EXAMPLE 74

A suspension of 417 parts of leuco crystal violet-o-carboxylic acid, 60 parts of glacial acetic acid, 1500 parts of methanol, 10 parts of salcomine and 5 parts of chloroanil is oxidized with 32 parts of oxygen at 50° C. After cooling, the crystalline precipitate formed is filtered off and washed with 500 parts of methanol. The yield is 372 parts of crystal violet lactone. Melting point: 171° to 173° C.

EXAMPLE 75

A mixture of 473 parts of 4,4'-bisdiethylamino-4''-dimethylamino-2''-hydroxycarbonyltriphenylmethane, 2000 parts of ethanol, 60 parts of glacial acetic acid, 10 parts of bromoanil and 10 parts of complex No. (23) is oxidized with oxygen at 50° C. After 16 parts of oxygen has been absorbed, the reaction mixture is cooled to 10° C., the precipitate is filtered off and washed with 500 parts of ethanol. After having been recrystallized from benzene, the substance melts at 170° C. The yield is 390 parts.

EXAMPLE 76

A mixture of 254 parts of 4,4'-bisdimethylaminodiphenylmethane, 121 parts of dimethylaniline, 10 parts of chloroanil, 10 parts of complex No. (27) and 475 parts of propionic acid is treated at 50° C. with air for ten hours with vigorous stirring. The reaction product is dissolved in 2000 parts of water at 80° C., the solution is filtered and the dye is precipitated at pH 1.5 to 2.0 by adding sodium chloride solution, suction filtered and washed with water. A yield of 361 parts (Basic Violet 3) is obtained.

When 10 parts of complex No. (4) and 475 parts of glacial acetic acid are used (instead of complex No. (27)) a yield of 347 parts of dye is obtained.

We claim:
1. A process for the catalytic oxidation of an arylmethane of the formula

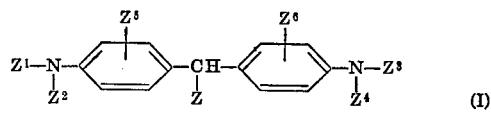

in which
Z$^1$ and Z$^3$ each is hydrogen, alkyl of one to four carbon atoms, hydroxyalkyl of two or three carbon atoms, cyanoethyl, carboalkoxyalkyl of a total of 2 to 5 carbon atoms, methoxyethyl, ethoxyethyl, alkanoyloxyalkyl of a total of four to eleven carbon atoms, cyclohexyl, benzyl, phenylethyl, phenyl or phenyl substituted by methyl, methoxy or ethoxy or

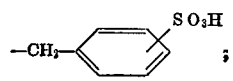

Z$^2$ and Z$^4$ each is hydrogen, alkyl of one to four carbon atoms, hydroxyalkyl of two to three carbon atoms, cyanoethyl, methoxyethyl, ethoxyethyl or phenyl;
Z$^1$ and Z$^2$ or Z$^3$ and Z$^4$ when taken together with the accompanying nitrogen atom also form morpholine, piperidino, piperazino or pyrrolidino;
Z$^5$ is hydrogen, chlorine, methyl, methoxy or ethoxy;
Z$^6$ is hydrogen, chlorine, methyl, methoxy or ethoxy;
Z is hydrogen, phenyl or phenyl substituted by chlorine, methyl, hydroxy, methoxy, ethyl or hydrosulfonyl, 1-methyl-2-phenylindolyl-3, 2-methylindolyl-3, 2-phenylindolyl-3, 1-cyanoethyl-2-methylindolyl-3, 1-phenylpyrazolyl-4, 1,3-diphenylpyrazolyl, 1-phenyl-3-methylpyrazolyl-4, 1-phenyl-2,3-dimethylpyrazolinon-5-yl-4, 1,4-perimidinyl-4, perimidonyl-4 or

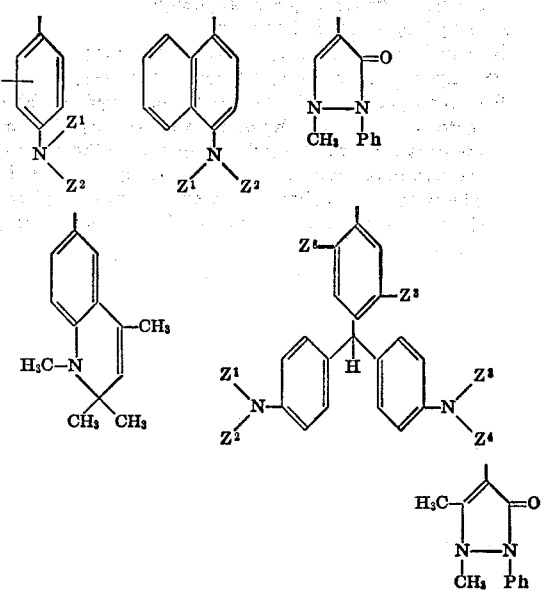

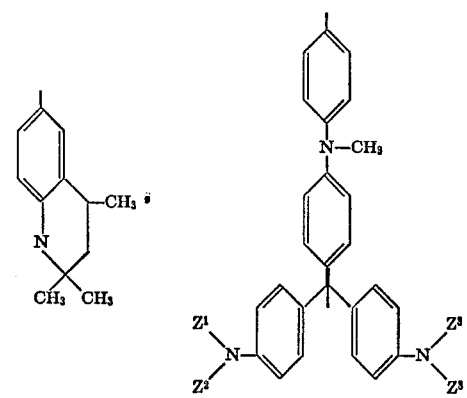

Z$^7$ is hydrogen, chlorine, methyl, methoxy, ethoxy, acetylamino or carboxyl; and
Z$^8$ is hydrogen or chlorine, which process comprises treating one mole of the arylmethane compound of the above formula with oxygen in the presence of about 10$^{-3}$ to 10$^{-1}$ mole of a quinone selected from the class consisting of benzoquinone which is substituted by fluorine, chlorine, bromine or cyano and nitrophenanthrenequinone and about 10$^{-3}$ to 4·10$^{-1}$ mole of an oxygen-activating organic metal complex catalyst in which a metal selected from the group consisting of copper, vanadium, molybdenum, iron or cobalt is chelated with the oxygen or nitrogen atom of a chelate-forming organic compound.

2. A process as claimed in claim 1 wherein said arylmethane has the formula:

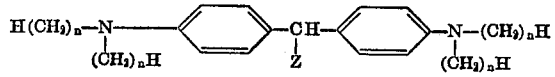

in which n is 1 or 2 and Z has the meanings given in claim 1.

3. A process as claimed in claim 1 wherein the arylmethane being subjected to catalytic oxidation has the formula.

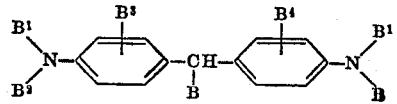

in which:
B¹ is hydrogen, methyl, ethyl, cyanoethyl, phenyl, p-methoxyphenyl or p-ethoxyphenyl,
B² is hydrogen, methyl or ethyl,
B³ is hydrogen, chlorine, methyl or methoxy,
B⁴ is hydrogen, chlorine, methyl or methoxy,
B is hydrogen, phenyl or phenyl substituted by chlorine, methoxy, carboxyl, hydroxysulfonyl, dimethylamino, diethylamino or N-methyl-N-β-cyanoethylamino; dimethylamino naphthyl; diethylamino naphthyl; N-phenylamino naphthyl; 2-methylindolyl; 2-phenylindolyl; 1-methyl-2-phenylindolyl or 1-cyanoethyl-2-methylindolyl.

4. A process as claimed in claim 1 wherein the metal of said complex catalyst is iron.

5. A process as claimed in claim 1 wherein the metal of said complex catalyst is cobalt.

References Cited

JACS, 84:2349–2356 (1962), Ritchie et al.
JACS, 92:899–905 (February 1970), Lewis et al.
C.A., 59:6983c (1963), Pajakoff.
C.A., 46:8485a (1952), Glavind.

HENRY R. JILES, Primary Examiner
S. D. WINTERS, Assistant Examiner

U.S. Cl. X.R.

260—288 R, 310R, 310 A, 343.3, 388, 391, 393, 570 AB, 687

UNITED STATES PATENT AND TRADEMARK OFFICE
CERTIFICATE OF CORRECTION

PATENT NO. : 3,828,071
DATED : August 6, 1974
INVENTOR(S) : Hellmut Kast et al.

It is certified that error appears in the above-identified patent and that said Letters Patent are hereby corrected as shown below:

In Column 3, Line 75, delete "...to the formula (VIII)" and substitute --... to the formula (VII)--

In Column 4, the first formula, delete

"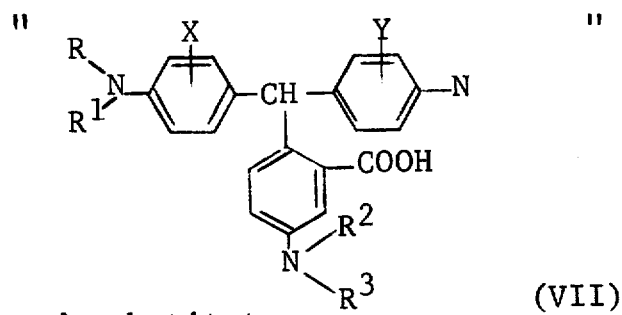"     (VII)

and substitute

--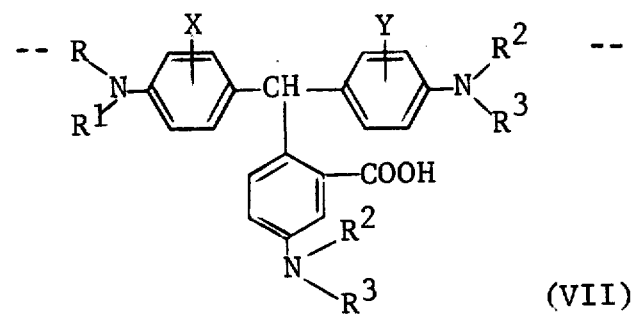--     (VII)

In Column 4, Line 41, delete "... orthoposition: 1,2,4-tetramethyl-..." and substitute --... orthoposition: 1,2,2,4-tetramethyl-...--

Signed and Sealed this

Third Day of August 1976

[SEAL]

Attest:

RUTH C. MASON
Attesting Officer

C. MARSHALL DANN
Commissioner of Patents and Trademarks